US011904748B2

(12) United States Patent
Li et al.

(10) Patent No.: US 11,904,748 B2
(45) Date of Patent: Feb. 20, 2024

(54) ROTATABLE ARMREST AND CONSOLE ASSEMBLY INCLUDING THE SAME

(71) Applicants: Hyundai Motor Company, Seoul (KR); Kia Corporation, Seoul (KR); Nifco Korea Inc., Asan-si (KR); Seoyon E-Hwa Co., Ltd., Anyang-si (KR)

(72) Inventors: Cheng Kun Li, Yantai (CN); Chun Lei Sang, Yantai (CN); Won Young Bae, Seoul (KR); Bong Ju Choi, Anyang-si (KR); Dae Kyo Kim, Asan-si (KR)

(73) Assignees: Hyundai Motor Company, Seoul (KR); Kia Corporation, Seoul (KR); NIFCO KOREA INC., Asan-si (KR); SEOYON E-HWA CO., LTD., Anyang-si (KR)

( * ) Notice: Subject to any disclaimer, the term of this patent is extended or adjusted under 35 U.S.C. 154(b) by 314 days.

(21) Appl. No.: 17/541,045

(22) Filed: Dec. 2, 2021

(65) Prior Publication Data
US 2022/0314855 A1 Oct. 6, 2022

(30) Foreign Application Priority Data

Apr. 6, 2021 (CN) .......................... 202110366476.7

(51) Int. Cl.
*B60N 2/70* (2006.01)
*B60N 2/75* (2018.01)
*B60N 2/90* (2018.01)
*B60R 7/04* (2006.01)

(52) U.S. Cl.
CPC ............. *B60N 2/767* (2018.02); *B60N 2/753* (2018.02); *B60N 2/793* (2018.02); *B60N 2/943* (2018.02); *B60R 7/04* (2013.01)

(58) Field of Classification Search
CPC ........ B60N 2/767; B60N 2/753; B60N 2/943; B60N 2/793; B60R 7/04
See application file for complete search history.

(56) References Cited

U.S. PATENT DOCUMENTS

| 5,290,092 | A | * | 3/1994 | Geer | ...................... | B60N 2/793 |
| | | | | | | 297/411.32 |
| 6,652,032 | B2 | * | 11/2003 | Laval | ..................... | B60N 2/753 |
| | | | | | | 297/411.32 |
| 8,662,594 | B2 | * | 3/2014 | Faccin | ................... | B60N 2/767 |
| | | | | | | 248/118 |
| 9,468,302 | B2 | * | 10/2016 | Negusse | ............ | B64D 11/0646 |
| 10,434,912 | B2 | * | 10/2019 | Zapf | ...................... | B60N 2/753 |

(Continued)

*Primary Examiner* — Philip F Gabler
(74) *Attorney, Agent, or Firm* — MORGAN, LEWIS & BOCKIUS LLP

(57) ABSTRACT

A rotatable armrest includes: a housing; a button system; and a hinge system engaged to the button system, in which the button system and the hinge system are provided in the housing, in which the hinge system includes a hinge shaft, and the rotatable armrest is fixed at a first position, a second position, or a third position by being rotated about the hinge shaft, and in which the rotatable armrest is configured to be positioned to be folded downward at the first position, the rotatable armrest is configured to be positioned to be directed forward horizontally at the second position, and the rotatable armrest is configured to be positioned to be directed rearward horizontally at the third position.

16 Claims, 19 Drawing Sheets

(56) References Cited

U.S. PATENT DOCUMENTS

| | | | |
|---|---|---|---|
| 11,535,176 B2* | 12/2022 | Quesnel | B60N 2/06 |
| 2003/0122397 A1* | 7/2003 | Maibom | B60N 2/3011 |
| | | | 296/69 |
| 2007/0085363 A1* | 4/2007 | Sturt | B60R 7/04 |
| | | | 296/37.8 |
| 2007/0296234 A1* | 12/2007 | Sturt | B60R 7/04 |
| | | | 296/24.34 |
| 2008/0030061 A1* | 2/2008 | Pejathaya | B60N 2/856 |
| | | | 297/367 R |
| 2011/0140472 A1* | 6/2011 | Vander Sluis | B60R 11/00 |
| | | | 296/24.34 |

* cited by examiner

ROTATABLE ARMREST AND CONSOLE ASSEMBLY INCLUDING THE SAME

CROSS-REFERENCE TO RELATED APPLICATION

The present application claims priority to Chinese Patent Application No. 202110366476.7 filed in the Chinese National Intellectual Property Administration on Apr. 6, 2021, the entire contents of which is incorporated herein for all purposes by this reference.

BACKGROUND OF THE INVENTION

Field of the Invention

The present invention relates to a rotatable armrest, and more particularly, to a rotatable armrest for a vehicle and a console assembly including the rotatable armrest.

Description of Related Art

In general, a console assembly for a vehicle is provided between a driver seat and a passenger seat in a vehicle and includes a storage box for temporarily storing an article. An armrest is provided on the storage box of the console assembly, serves as a cover, and allows a passenger accommodated in a vehicle seat to place his or her arm comfortably on the armrest.

FIG. 1 and FIG. 2 illustrate a console assembly including an armrest used as an article storage box and an article storage box cover in the related art. The armrest may rotate by 90° (i.e., an angle α indicated in FIG. 2) to open the article storage box, and the article storage box provides a storage space.

The armrest of the console assembly in the related art has a problem in that there is no device for mounting an article such as a cup or a phone of a passenger accommodated in a rear seat. Furthermore, the console assembly occupies a large space because the console assembly needs to support the armrest when the armrest is closed.

Therefore, there is a need to additionally improve the console assembly in the related art and the armrest included in the console assembly.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a rotatable armrest apparatus, which is rotated to save a space for storing an article in a console assembly, and the console assembly including the rotatable armrest.

The present invention, in various aspects thereof, has also been made in an effort to provide a rotatable armrest apparatus and a console assembly including the rotatable armrest, which are configured for not only allowing a passenger accommodated in a front seat to conveniently place an article, but further allowing a passenger accommodated in a rear seat to conveniently place an article.

Various aspects of the present invention are directed to providing a rotatable armrest apparatus including: a housing; a button system; and a hinge system engaged to the button system, in which the button system and the hinge system are provided in the housing, in which the hinge system includes a hinge shaft, and the rotatable armrest apparatus is fixed at a first position, a second position, or a third position by being rotated about the hinge shaft, and in which the rotatable armrest apparatus is configured to be positioned to be folded downward at the first position, the rotatable armrest apparatus is configured to be positioned to be directed forward horizontally at the second position, and the rotatable armrest apparatus is configured to be positioned to be directed rearward horizontally at the third position.

The housing may be defined by an upper cover of the armrest and a lower cover of the armrest, and an opening portion may be provided at a front side of the housing.

The button system may include a button and a wire, the button may be positioned in the opening portion, and the wire may be pulled when the button is pushed.

The button system may further include a button rod, a lever, and a button spring, a first end portion of the button rod may be provided at a rear side of the button, a second end portion of the button rod may be connected to the button spring, the button spring may apply a restoring force to the button rod forward, the button rod may have a concave groove, the lever may be rotatably provided, a first end portion of the lever may be provided in the concave groove of the button rod, and a second end portion of the lever may be connected to a first end portion of the wire.

The button system may further include a button cover and a button plate, the button, the button rod, the lever, and the button spring may be provided on the button plate, and the button cover may cover the button, the button rod, the lever, and the button spring from above.

The hinge shaft may include a cam, the cam may have three stepped portions, the three stepped portions may each include an arc portion and a stepped part, the stepped part may extend in an approximately radial direction, and the arc portion may extend from the high-level stepped portion to the low-level stepped portion.

The three stepped portions may include a first stepped portion, a second stepped portion, and a third stepped portion, the first stepped portion may include a first arc portion and a first stepped part positioned on a bottom portion of the cam, the second stepped portion may include a second stepped part positioned at an upper side, and a second arc portion extending from a bottom portion of the first stepped part to an upper portion of the second stepped part, a diameter of the second arc portion may increase as an arc becomes closer to the second stepped portion, the third stepped portion may include a third stepped part positioned at a rear side of the cam, and a third arc portion extending between a bottom portion of the second stepped part and a bottom portion of the third stepped part, and a diameter of the third arc portion may mainly not be changed.

The hinge system may further include a hinge plate, a support body assembly, a locking key assembly, and a brake wheel assembly, the support body assembly, the locking key assembly, and the brake wheel assembly may be provided on the hinge plate, and the hinge shaft may be provided on the brake wheel assembly.

The support body assembly may include an upper brake wheel cover and a lower brake wheel cover, and a brake wheel cover opening portion may be provided in a lateral surface of the upper brake wheel cover directed forward thereof. The brake wheel assembly may include a brake wheel and a brake wheel pad, the hinge shaft may penetrate the brake wheel and be fixedly connected to the brake wheel, and the brake wheel pad may be provided on the support body assembly and come into friction contact with the brake wheel.

The brake wheel and the brake wheel pad may be manufactured as friction members.

The locking key assembly may include a locking key, a locking key cover, and a locking key spring, the locking key cover may be provided on the upper brake wheel cover, the locking key may be provided on the locking key cover, a first end portion of the locking key may be connected to the wire, a second end portion of the locking key may engage with the stepped portion of the cam, and the locking key spring may apply a force to the locking key in a direction toward the three stepped portions.

The locking key may include a main body and a guide rod, the main body may be accommodated in the locking key cover, penetrate the brake wheel cover opening portion of the upper brake wheel cover, and engage with the stepped portion of the cam, the guide rod may protrude from the locking key cover, and the locking key spring may be provided on the guide rod.

Various aspects of the present invention are directed to providing a console assembly including: a console; the rotatable armrest apparatus described above; and a connection device configured to install the armrest on the console.

The connection device may include a hinge mounting bolt for mounting an armrest assembly on the console.

The rotatable armrest apparatus according to the exemplary embodiment of the present invention may be positioned at different positions by being rotated about the hinge shaft such that not only the person accommodated in the front seat, but further the person accommodated in the rear seat, may use the rotatable armrest, and the space for the console assembly in the folded state is saved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
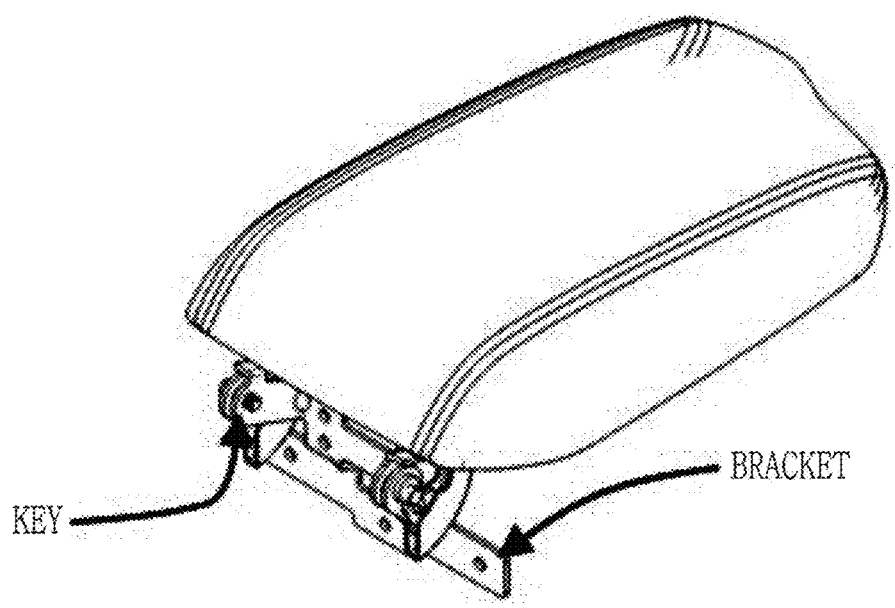
FIG. 1 is a schematic view of an armrest in the related art.
Figure 2:
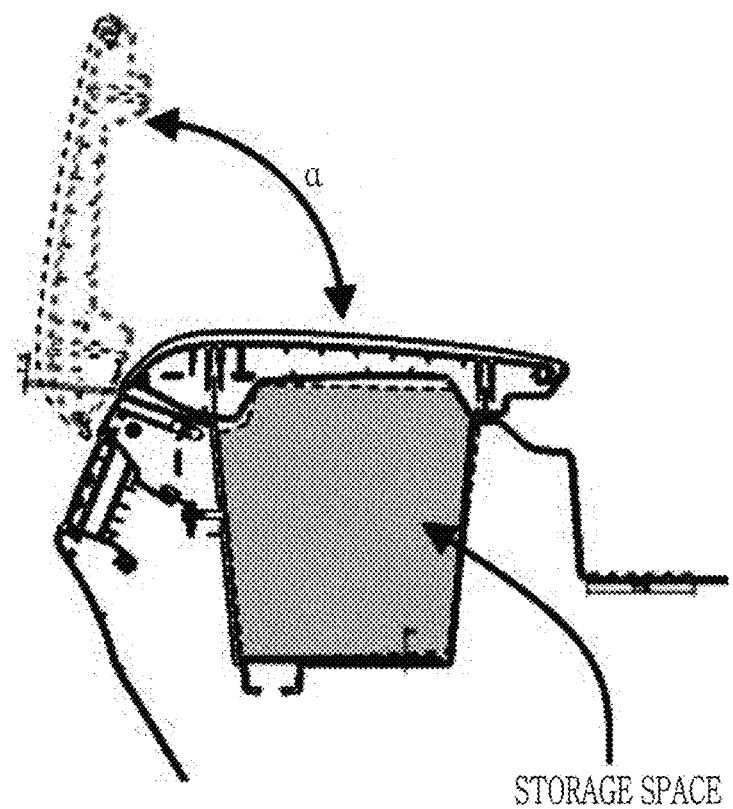
FIG. 2 is a schematic view of an armrest of a console assembly generally, in which the armrest may be opened or closed and a storage space disposed below the armrest may be exposed when the armrest is in an opened state indicated by the dotted line.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a rotatable armrest according to various exemplary embodiments of the present invention will be described with reference to FIGS. 3 to 19.

A rotatable armrest 100 according to various exemplary embodiments of the present invention includes a housing 110 and 120, a button system 130, and a hinge system 140. The button system 130 and the hinge system 140 are provided in the housing 110 and 120.

The hinge system includes a hinge shaft 12. The rotatable armrest 100 may rotate about the hinge shaft 12 and be fixed at a first position, a second position, and a third position. The rotatable armrest 100 is folded downward at the first position, the rotatable armrest 100 is directed forward horizontally at the second position, and the rotatable armrest 100 is directed rearward horizontally at the third position.

Figure 7:
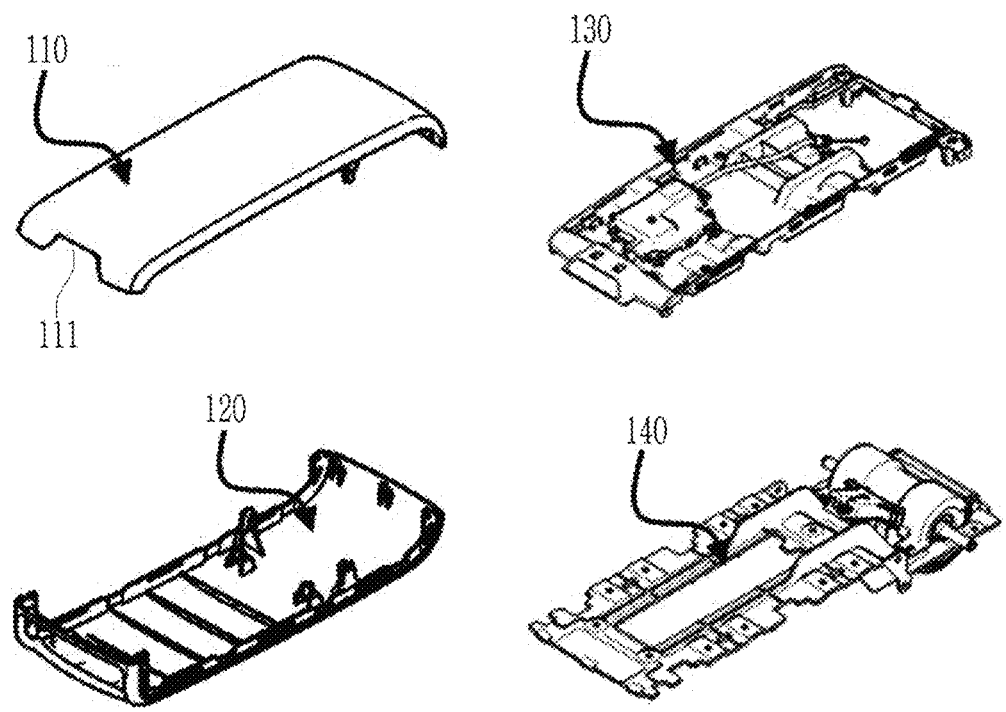
FIG. 7 is an exploded perspective view of the rotatable armrest according to the exemplary embodiment of the present invention.

As illustrated in FIG. 7, the rotatable armrest 100 according to the exemplary embodiment of the present invention includes an upper cover 110 of the armrest, the button system 130, the hinge system 140, and a lower cover 120 of the armrest. The housing for accommodating the button system 130 and the hinge system 140 is defined by coupling the upper cover 110 of the armrest and the lower cover 120 of the armrest.

Figure 8:
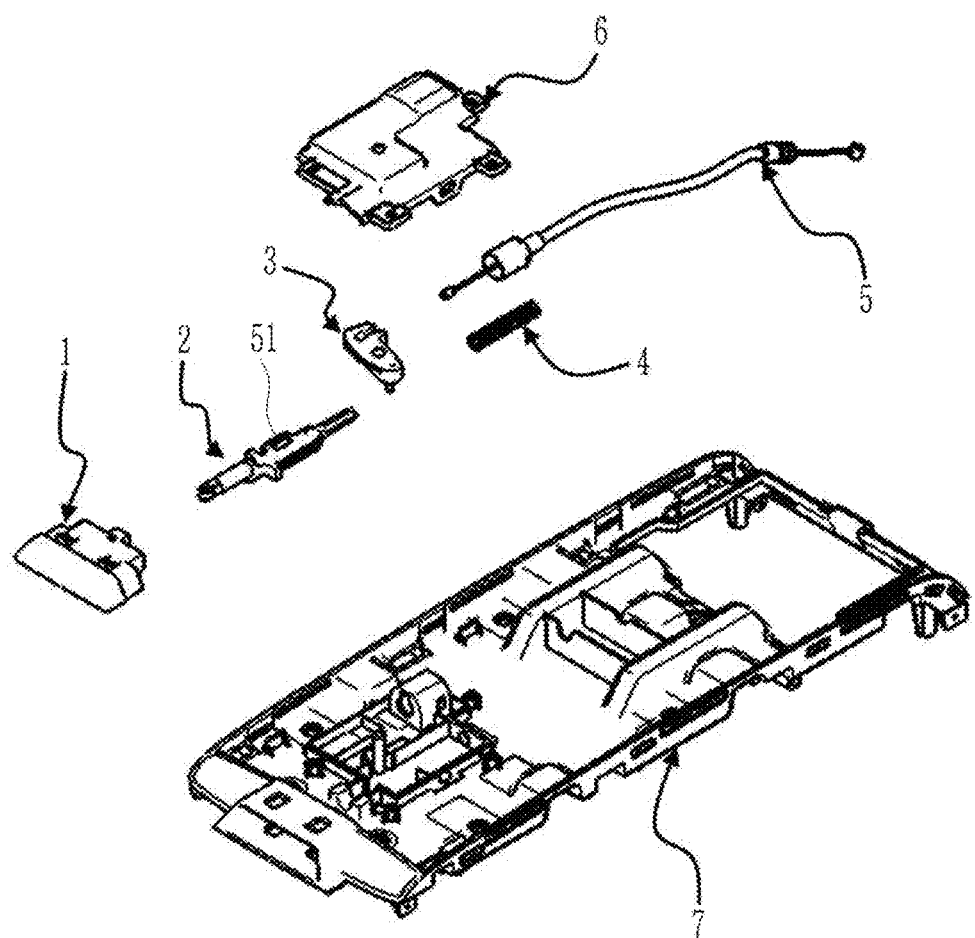
FIG. 8 is an exploded perspective view of a locking key assembly according to the exemplary embodiment of the present invention.
Figure 10:
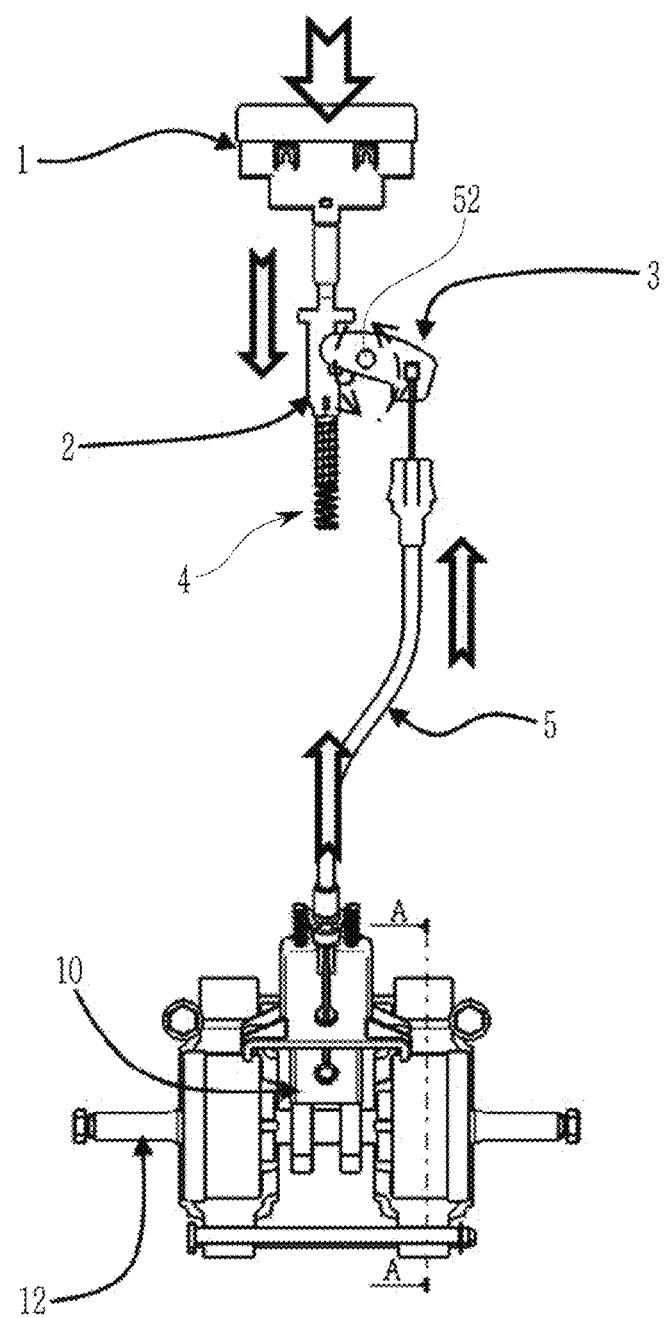
FIG. 10 is a top plan view exemplarily illustrating a hinge system and a button system according to the exemplary embodiment of the present invention, in which a hinge plate and a button cover are excluded.
Figure 11:
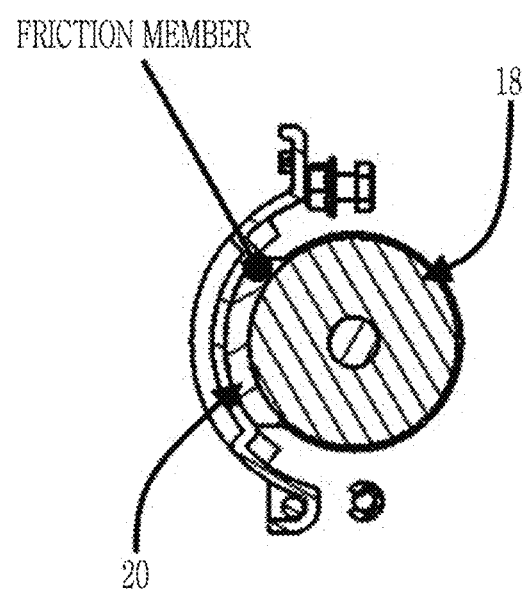
FIG. 11 is a cross-sectional view taken along cross-sectional line A-A in FIG. 10.
Figure 12:
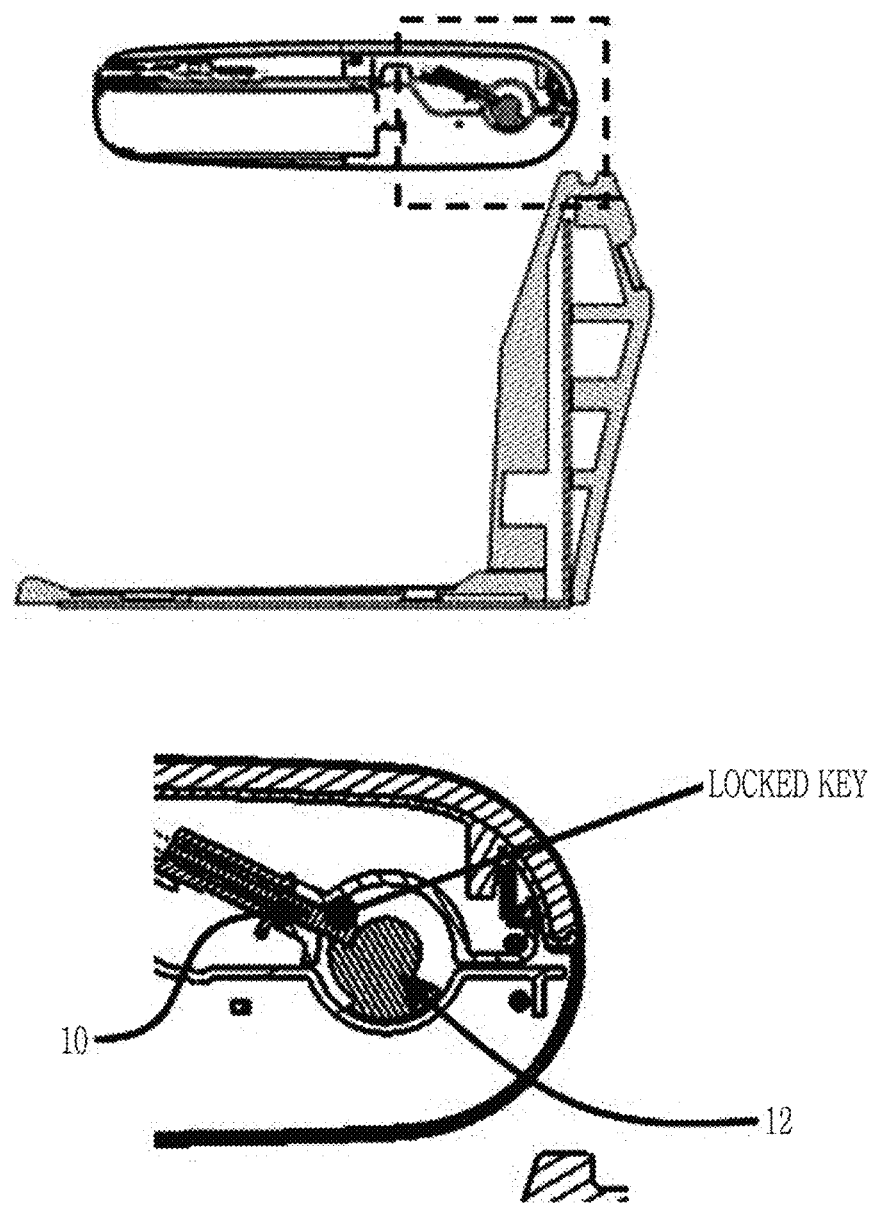
FIG. 12 is a schematic view exemplarily illustrating a state in which the rotatable armrest according to the exemplary embodiment of the present invention is positioned to be used by the person accommodated in the front seat and a locking key is in a locked state.
Figure 13:
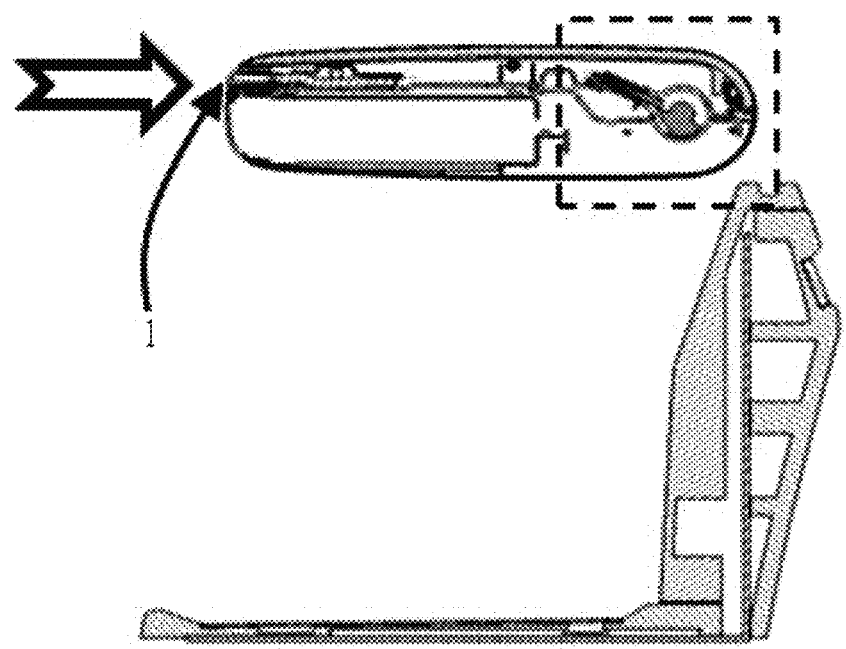
FIG. 13 is a schematic view exemplarily illustrating a state in which the rotatable armrest according to the exemplary embodiment of the present invention is positioned to be used by the person accommodated in the front seat and the locking key is in an unlocked state.
Figure 13:
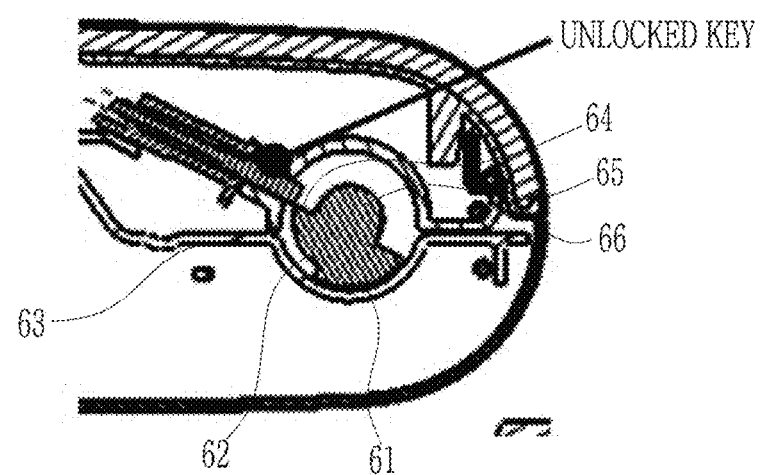

As illustrated in FIGS. 8 and 10, the button system 130 includes a button 1, a button rod 2, a lever 3, a button spring 4, a wire 5, a button cover 6, and a button plate 7.

The button 1, the button rod 2, the lever 3, the button spring 4, and the wire 5 may be provided on the button plate 7. The button cover 6 partially covers the button 1, the button rod 2, the lever 3, the button spring 4, and the wire 5 from above to protect these components, preventing foreign substances from being introduced and affecting the operation of the button system 130.

The button 1 may be positioned in an opening portion 111 disposed at a front end portion of the housing defined by the upper cover 110 of the armrest and the lower cover 120 of the armrest. An operator may manipulate the armrest 100 by pushing the button 1.

A front end portion of the button rod 2 is connected to a rear end portion of the button 1, and a rear end portion of the button rod 2 is connected to the button spring 4. The button rod 2, together with the button 1, may move forward or rearward thereof, and the button spring 4 applies a restoring force to the button rod 2 in a direction toward the button 1 (i.e., in a forward direction). A single concave groove 51 is formed in a center portion of the button rod 2, and one end portion of the lever 3 is inserted into the concave groove 51.

The lever 3 is provided on the button plate 7 to be rotatable by a pin shaft 52. One end portion of the lever 3 is inserted into the concave groove 51 of the button rod 2, and the other end portion of the lever 3 is connected to one end portion of the wire 5. The other end portion of the wire 5 is connected to a locking key assembly to be described below.

When the button 1 is pushed, the button 1 moves the button rod 2 rearward thereof. As the button rod 2 moves rearward thereof, the concave groove 51 of the button rod 2 rotates the lever 3 provided in the concave groove 51 and pulls the wire 5 positioned at the other end portion of the lever 3.

Figure 9:
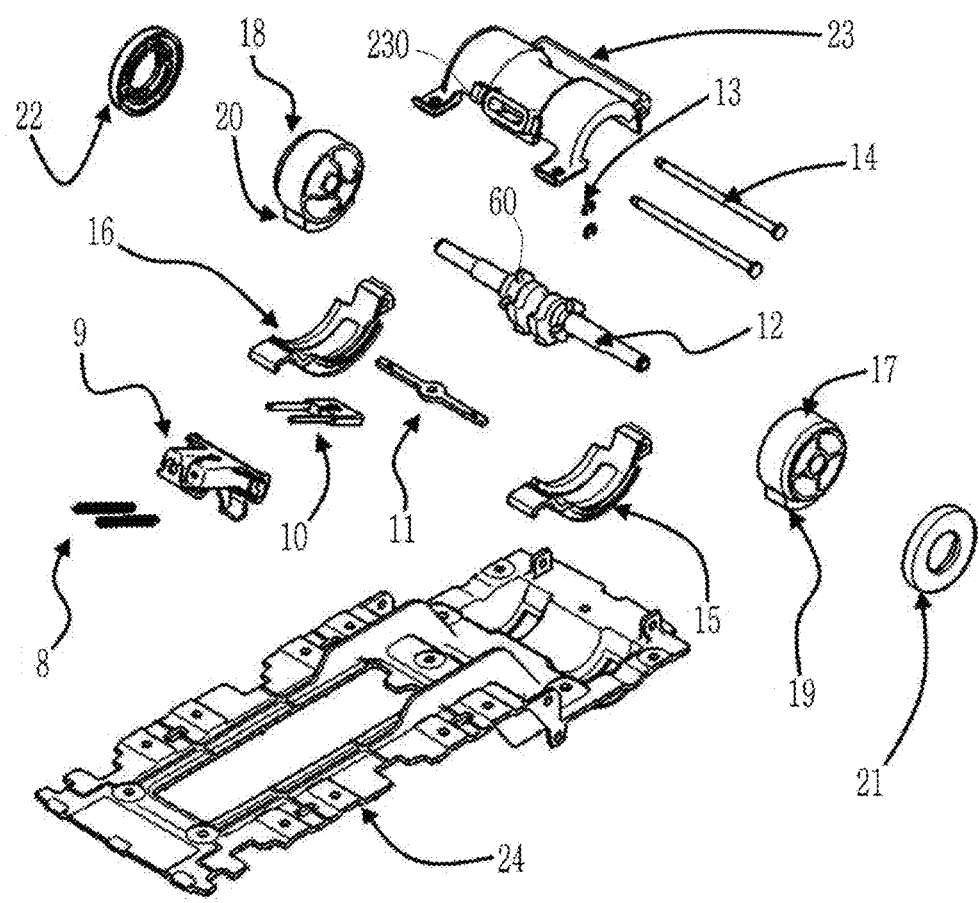
FIG. 9 is an exploded perspective view of a hinge system according to the exemplary embodiment of the present invention.

As illustrated in FIG. 9 and FIG. 10, the hinge system 140 includes a hinge plate 24, a support body assembly, the locking key assembly, a brake wheel assembly, and the hinge shaft 12. The support body assembly, the locking key assembly, and the brake wheel assembly are provided on the hinge plate 24, and the hinge shaft 12 is provided on the brake wheel assembly. The other components may rotate about the hinge shaft 12 to reverse the armrest 100 during the use.

The support body assembly includes an upper brake wheel cover 23 and lower brake wheel covers 15 and 16.

A brake wheel cover opening portion 230 is provided at a side of the upper brake wheel cover 23 directed forward thereof.

The upper brake wheel cover 23 is provided on the hinge plate 24 by a center pin 14. The hinge plate 24 has a protrusion protruding upward, the protrusion has a hole, and a rim with a hole is further formed on a lateral side of the upper brake wheel cover 23. The center pin 14 is provided to penetrate the hole of the protrusion and a hole of the upper brake wheel cover 23. Thereafter, the upper brake wheel cover 23 is provided on the hinge plate 24 by being locked at an end portion of the center pin 14 by an "E"-shaped ring 13.

The upper brake wheel cover 23 and the lower brake wheel covers 15 and 16 form a support body for supporting the brake wheels 17 and 18. The lower brake wheel covers 15 and 16 include the right lower brake wheel cover 15 and the left lower brake wheel cover 16 and are provided on the hinge plate 24.

The locking key assembly includes locking key springs 8, a locking key cover 9, and a locking key 10. The locking key cover 9 is provided at a position of the brake wheel cover opening portion of the upper brake wheel cover 23.

The locking key 10 is provided in the locking key cover 9 and may reciprocatingly move in the locking key cover 9. The locking key 10 includes a main body and two guide rods. The main body is disposed in a space in the locking key cover 9, introduced into the upper brake wheel cover 23 through the brake wheel cover opening portion 230 of the upper brake wheel cover 23, and coupled to a cam 60 of the hinge shaft 12 which will be described below. The two guide rods penetrate an opening portion provided in the locking key cover 9, and the locking key springs 8 are provided on portions of the guide rods that protrude from the locking key cover 9. The locking key springs 8 apply a restoring force to the locking key 10 in a direction toward the upper brake wheel cover 23.

The other end portion of the wire 5 is connected to the locking key 10. When the button 1 is pushed and the wire 5 is moved, the locking key 10 is moved forward and separated from the cam 60 of the hinge shaft 12. When the button 1 is released, the button 1 is restored by operation of the button spring 4 such that the locking key 10 is moved rearward by the restoring force of the locking key springs 8 and presses and comes into close contact with the cam 60 of the hinge shaft 12.

The cam 60 is provided on a center portion of the hinge shaft 12. The main body of the locking key 10 may press and come into close contact with an external surface of the cam 60. In the illustrated exemplary embodiment included in the exemplary embodiment, two cams 60 are provided. However, one cam 60 or three to five cams 60 may be provided.

Referring to FIG. 12, FIG. 13, FIG. 14, and FIG. 15, three stepped portions are provided on the cam 60, and each of the three stepped portions include an arc portion and a stepped part. The stepped part extends in an approximately radial direction, and the arc portion extends from a high-level stepped portion to a low-level stepped portion thereof.

The first stepped portion includes a first arc portion 61 and a first stepped part 62 positioned on a bottom portion of the cam 60. The first arc portion 61 extends between an upper portion of the first stepped part 62 and an upper portion of a third stepped part 66 to be described below and comes into contact with an internal periphery of the support body assembly. A diameter of the first arc portion 61 is mainly not changed. The second stepped portion includes a second stepped part 64 positioned at an upper side, and a second arc portion 63 extending from a bottom portion of the first stepped part 62 to an upper portion of the second stepped part 64. A diameter of the second arc portion 63 increases as the arc gradually becomes closer to the second stepped part 64 such that the second arc 63 does not obstruct a motion of the locking key 10 when the locking key 10 passes the second arc 63. The third stepped portion includes the third stepped part 66 positioned at a rear side of the cam 60, and a third arc portion 65 extending between a bottom portion of the second stepped part 64 and a bottom portion of the third stepped part 66. A diameter of the third arc portion 65 is mainly not changed such that the third arc portion 65 does not obstruct the motion of the locking key 10 when the locking key 10 passes the third arc portion 65.

The rotatable armrest 100 may rotate about the hinge shaft 12, and the hinge shaft 12 does not move. The armrest 100 may be fixed at the first position, the second position, and the third position thereof. At the first position, the rotatable armrest 100 is folded downwardly in the accommodation state (see FIG. 14), and the locking key 10 comes into contact with the first stepped part 62 and presses and comes into contact with the first stepped part 62. At the second position, the rotatable armrest 100 is directed forward horizontally and positioned to be used by the person accommodated in the front seat (see FIG. 12), and the locking key 10 comes into contact with the second stepped part 64 and presses and comes into close contact with the second stepped part 64. At the third position, the rotatable armrest 100 is directed rearward horizontally and positioned to be used by the person accommodated in the rear seat (see FIG. 15), and the locking key 10 comes into contact with the third stepped part 66 and presses and comes into close contact with the third stepped part 66.

The brake wheel assembly includes the brake wheels 17 and 18, brake wheel pads 19 and 20, end covers 21 and 22, and a brake wheel spring 11. The brake wheels include the right brake wheel 17 and the left brake wheel 18 and are provided on the support body formed by the upper brake wheel cover 23 and the lower brake wheel covers 15 and 16. The hinge shaft 12 is fixed by penetrating the right brake wheel 17 and the left brake wheel 18 such that the right brake wheel 17 and the left brake wheel 18 do not rotate at the time of reversing the armrest 100. The brake wheels allow the armrest 100 to be supported by the hinge shaft and are coupled to the support body to provide a frictional force to the armrest 100 at the time of reversing the armrest 100.

The brake wheel pads are provided on the support body and include the right brake wheel pad 19 and the left brake wheel pad 20. The right brake wheel pad 19 and the left brake wheel pad 20 are respectively provided on the lower brake wheel covers 15 and 16.

The brake wheel and the brake wheel pad are manufactured as friction members. The braking force is provided by the contact between the right brake wheel 17 and the right brake wheel pad 19 and the contact between the left brake wheel 18 and the left brake wheel pad 20, maintaining any position of the armrest 100 between the position at which the armrest 100 is folded and the position at which the armrest 100 is used by the person accommodated in the rear seat.

The end covers include the right end cover 21 and the left end cover 22 and are provided outside the brake wheels on the support body assembly, providing sealability.

The brake wheel spring 11 is provided at lower sides of the brake wheel pads and provides an elastic force to the brake wheel pads, maintaining the frictional force even after the brake wheels and the brake wheel pads are abraded.

Figure 4:
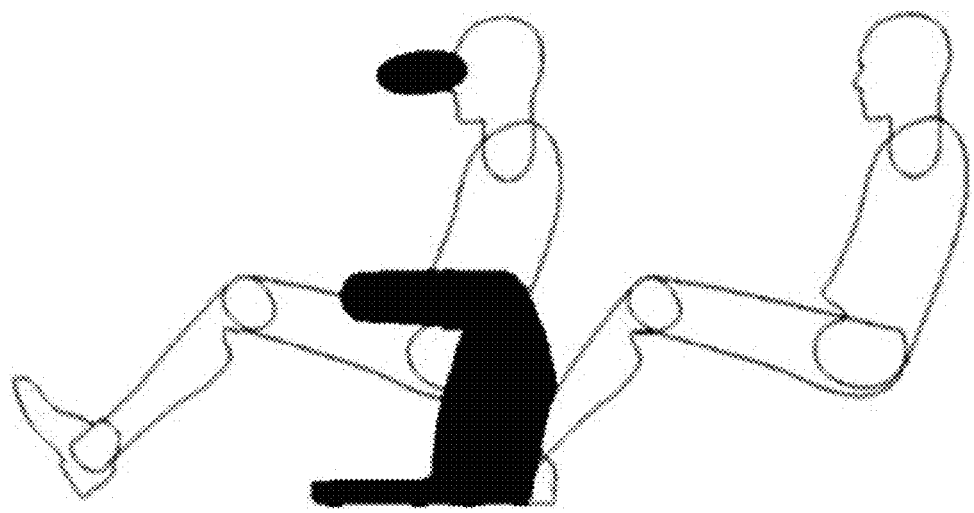
FIG. 4 is a schematic view exemplarily illustrating a state in which the rotatable armrest according to the exemplary embodiment of the present invention is used and the rotatable armrest is disposed to be used by a person accommodated in a front seat.
Figure 5:
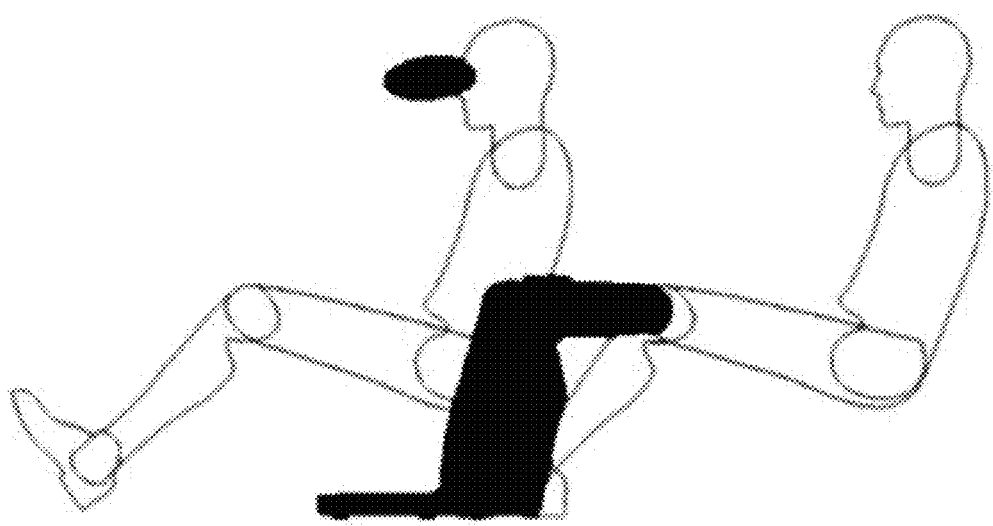
FIG. 5 is a schematic view exemplarily illustrating a state in which the rotatable armrest according to the exemplary embodiment of the present invention is used and the rotatable armrest is disposed to be used by a person accommodated in a rear seat.

FIG. 4 is a schematic view exemplarily illustrating a state in which the rotatable armrest according to the exemplary embodiment of the present invention is used and the rotatable armrest is disposed to be used by a person accommodated in a front seat. FIG. 5 is a schematic view exemplarily illustrating a state in which the rotatable armrest according to the exemplary embodiment of the present invention is used and the rotatable armrest is disposed to be used by a person accommodated in a rear seat.

Figure 18:
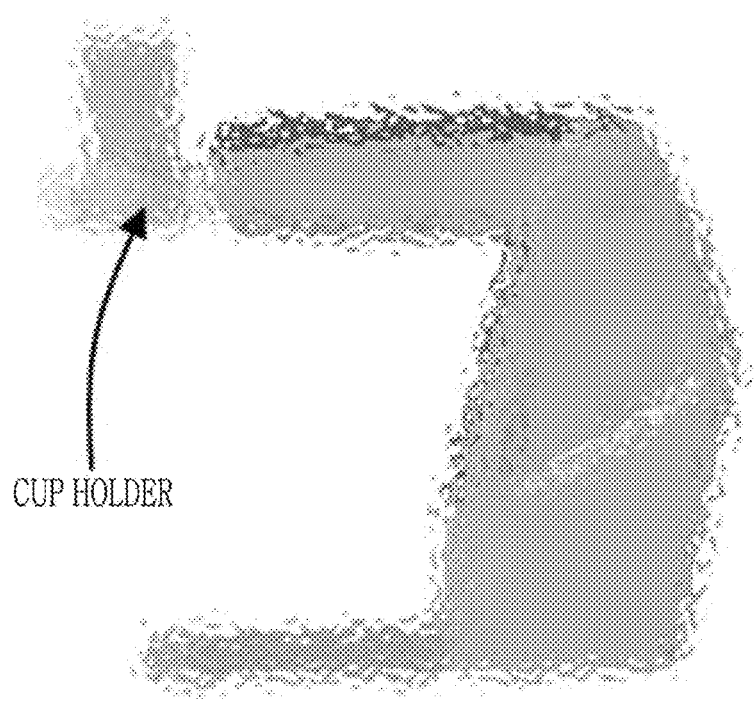
FIG. 18 is a schematic view exemplarily illustrating a state in which the console assembly according to the exemplary embodiment of the present invention is used and the rotatable armrest is disposed to be used by the person accommodated in the front seat.
Figure 19:
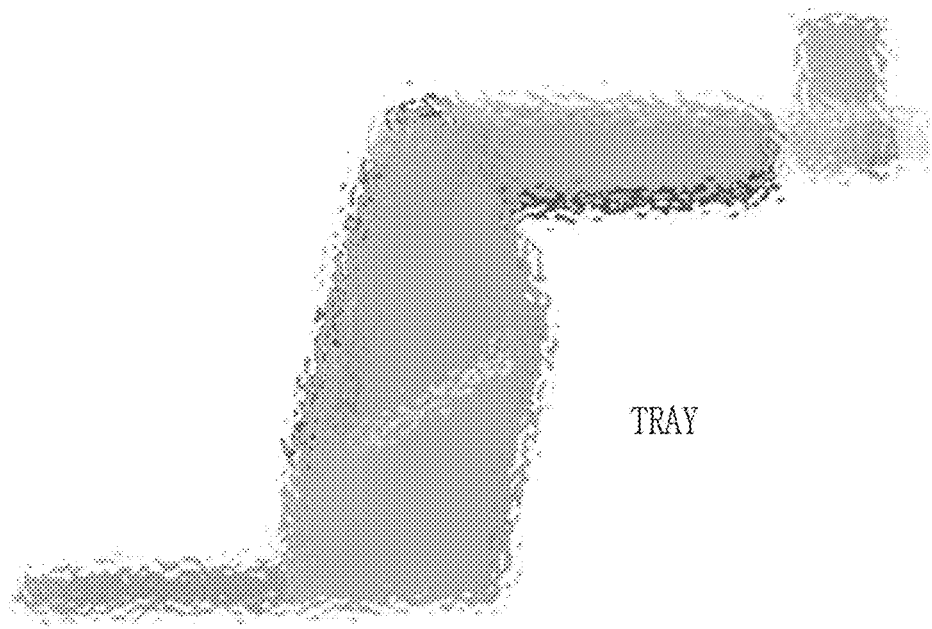
FIG. 19 is a schematic view exemplarily illustrating a state in which the console assembly according to the exemplary embodiment of the present invention is used and the rotatable armrest is disposed to be used by the person accommodated in the rear seat.

FIG. 18 and FIG. 19 are schematic views exemplarily illustrating states in which a console assembly according to the exemplary embodiment of the present invention is used. FIG. 18 illustrates that the rotatable armrest is disposed to be normally used by the person accommodated in the front seat, and a holder of a hidden type holder device provided in the armrest protrudes so that the person may place an article such as a cup on the holder. FIG. 19 illustrates that the rotatable armrest is disposed to be used by the person accommodated in the rear seat. When the passenger accommodated in the rear seat intends to place a cup or a phone on the holder of the hidden type holder device provided in the armrest, the passenger may reverse the armrest toward the rear seat and the holder protrudes.

Furthermore, a tray may be further provided at an upper lateral side or a lower lateral side of the armrest assembly such that the passenger may place other articles on the tray. According to various exemplary embodiments of the present invention, FIG. 19 illustrates that the tray is provided at the lower lateral side of the armrest. However, the tray may be provided at the upper lateral side of the armrest.

Figure 6:
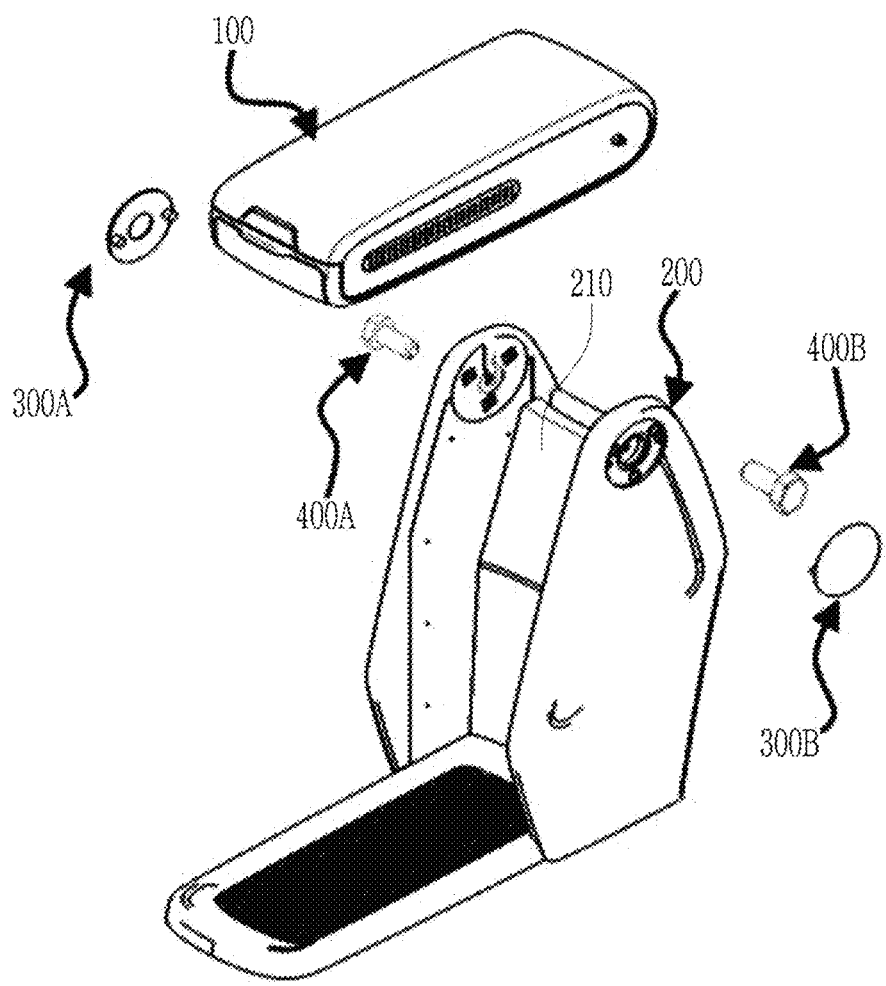
FIG. 6 is an exploded perspective view of a console assembly including the rotatable armrest according to the exemplary embodiment of the present invention.

FIG. 6 is an exploded perspective view of the console assembly including the rotatable armrest according to the exemplary embodiment of the present invention.

Figure 14:
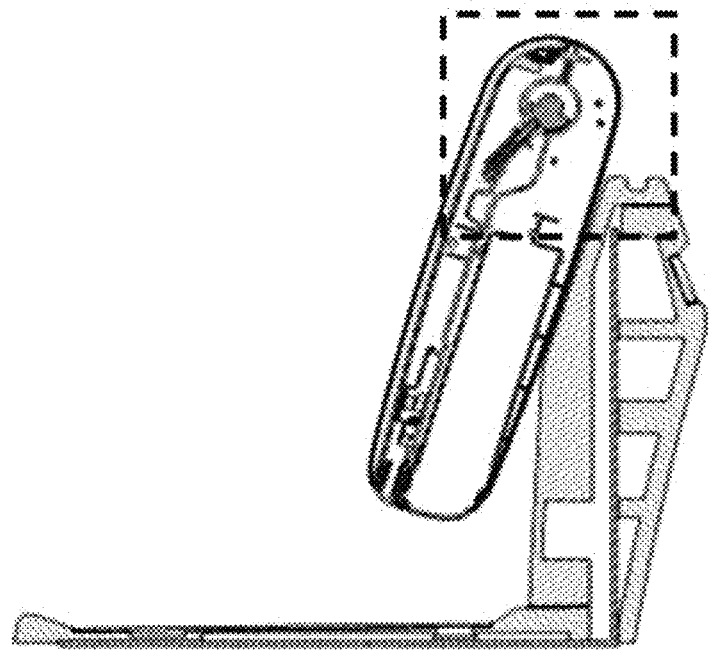
FIG. 14 is a schematic view exemplarily illustrating a state in which the rotatable armrest according to the exemplary embodiment of the present invention is positioned at an accommodation position.
Figure 14:
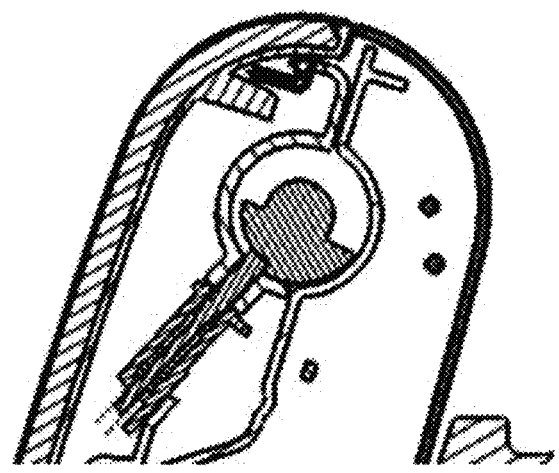
Figure 15:
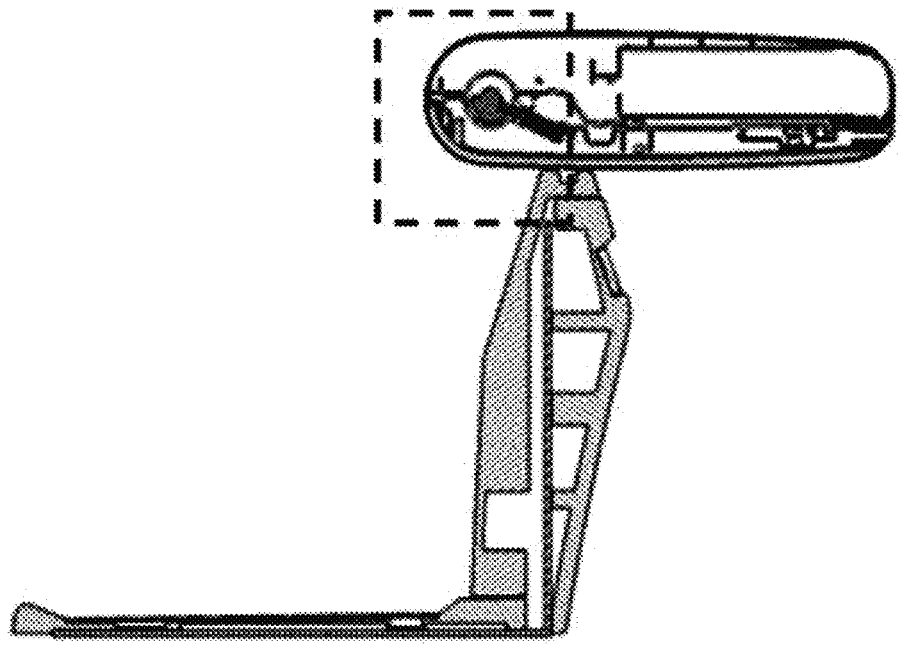
FIG. 15 is a schematic view exemplarily illustrating a state in which the rotatable armrest according to the exemplary embodiment of the present invention is positioned to be used by the person accommodated in the rear seat.
Figure 15:
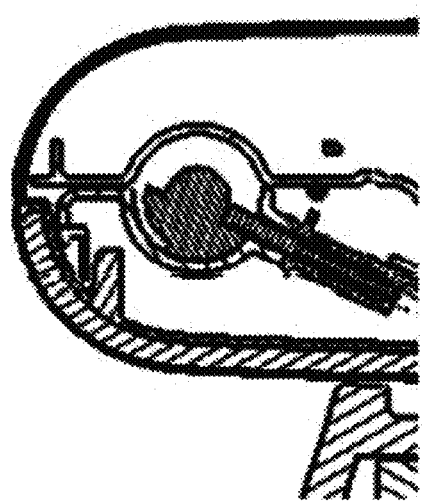
Figure 16:
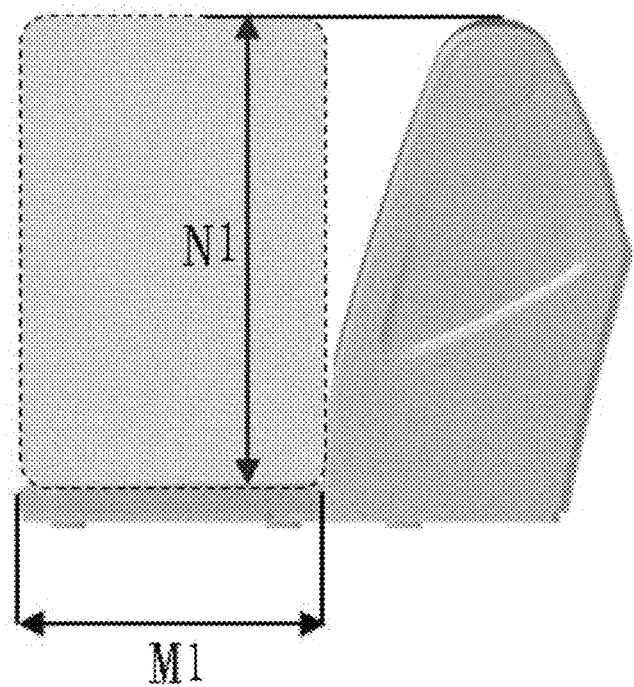
FIG. 16 is a schematic view exemplarily illustrating an available space of the console assembly when the rotatable armrest according to the exemplary embodiment of the present invention is positioned at the accommodation position.

The console assembly includes the rotatable armrest 100, a console 200, mounting covers 300A and 300B, and hinge mounting bolts 400A and 400B. The console 200 includes an inward concave groove 210. As illustrated in FIGS. 14 and 16, when the rotatable armrest 100 is folded and accommodated, the rotatable armrest 100 is disposed in the inward concave groove 210 such that the console assembly has a comparatively large storage space.

The hinge mounting bolts 400A and 400B include the left hinge mounting bolt 400A and the right hinge mounting bolt 400B. The hinge mounting bolts 400A and 400B penetrate holes formed on sidewalls of the console 200 and are connected to the hinge shaft 12 disposed at the rear side of the rotatable armrest 100 such that the hinge shaft 12 may be provided on the sidewalls of the console 200. The mounting covers 300A and 300B include the left mounting cover 300A and the right mounting cover 300B and are provided outside the sidewalls of the console 200 to maintain an external appearance of the console assembly.

Referring to FIG. 10, the hinge shaft 12 is provided on the left and right brake wheels 17 and 18, and two opposite end portions of the hinge shaft 12 protrude from the brake wheels 17 and 18. When the rotatable armrest 100 is provided on the console 200 (see FIG. 6), the end portions of the hinge shaft 12 are inserted into the holes formed in the sidewalls of the console 200 such that the rotatable armrest 100 may be provided on the console 200 by the left and right hinge mounting bolts 400A and 400B. The hinge shaft 12 does not move when the rotatable armrest 100 rotates.

Figure 3:
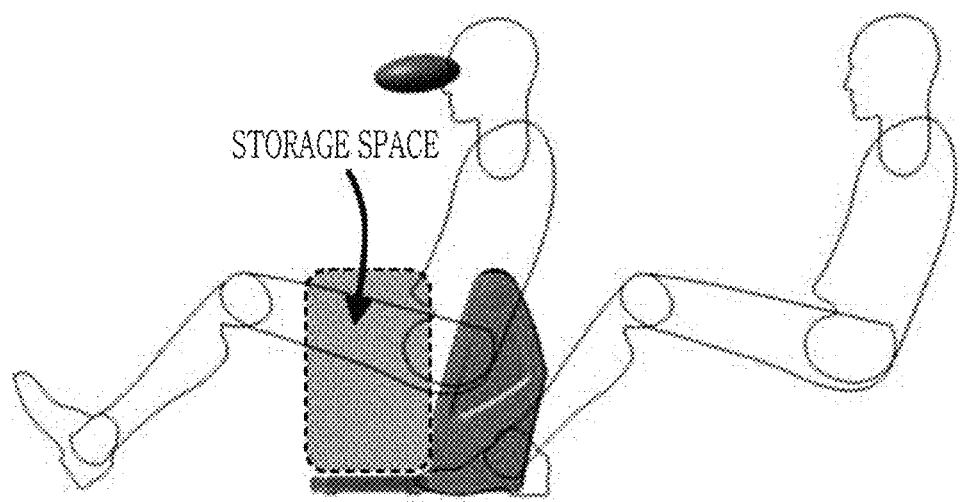
FIG. 3 is a schematic view exemplarily illustrating a state in which a rotatable armrest according to various exemplary embodiments of the present invention is used and the rotatable armrest is in an accommodation state.

The rotatable armrest 100 according to the exemplary embodiment of the present invention may be folded. As illustrated in FIG. 3, when the rotatable armrest 100 is folded into the console assembly, a larger storage space may be ensured.

Figure 17:
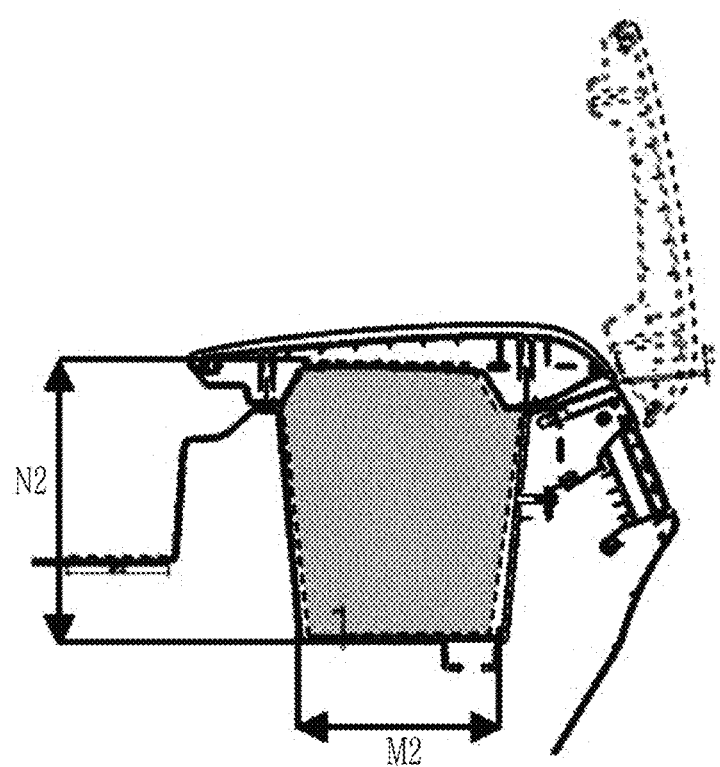
FIG. 17 is a schematic view exemplarily illustrating an available space of a console assembly in the related art.

Referring to FIG. 16, according to the exemplary embodiment of the present invention, a storage space of the console assembly having the rotatable armrest 100 has a height N1 of 473 mm, a width M1 of 270 mm, and a cross-sectional area of 270 mm×473 mm=127,710 mm². FIG. 17 is a schematic view exemplarily illustrating an available space of a console assembly generally, in which an article storage box has a height N2 of 196 mm, a width M2 of 128 mm, and a cross-sectional area of 128 mm×196 mm=25,088 mm². Therefore, according to the exemplary embodiment of the present invention, the cross-sectional area of the storage space of the console assembly is significantly greater than the size of the article storage box in the related art.

The rotatable armrest 100 of the console according to the exemplary embodiment of the present invention may rotate up to a 180° position, providing a cup holder and a tray for the passenger accommodated in the rear seat.

As a result, the console assembly having the rotatable armrest allows the passenger accommodated in the rear seat to more easily use the rotatable armrest and provides a larger storage space for the passenger accommodated in the front seat.

An operation of the rotatable armrest according to the exemplary embodiment of the present invention will be described below with reference to the drawings.

When the operator pushes the button 1 to pull and move the wire 5 forward, the wire 5 pulls and moves the main body of the locking key 10 forward such that the main body of the locking key 10 is separated from the stepped portion of the cam 60. Accordingly, the armrest 100 may rotate counterclockwise (see FIG. 13).

The rotatable armrest may be positioned at the three positions. At the first position, the rotatable armrest 100 is disposed at an angle of −74° with respect to a horizontal line and accommodated and folded in the inward concave groove 210 of the console 200. At the second position, the rotatable armrest 100 is disposed at an angle of 0° with respect to the horizontal line and positioned to be used by the person accommodated in the front seat. At the third position, the rotatable armrest 100 is disposed at an angle of 180° with respect to the horizontal line and positioned to be used by the person accommodated in the rear seat.

The processes of manipulating the rotatable armrest may include three processes.

From the second position to the first position)(0°→−74°):

The button 1 may be pushed, and then the armrest 100 may be folded (0°→−74°). The button system 130 may unlock the locking key 10 by decoupling the locking key 10 and the stepped portion of the cam 60 by moving the wire 5. Thereafter, the armrest 100 may rotate about the hinge shaft 12. Referring to FIG. 14, the first stepped part 62 of the cam 60 may restrict a folding angle of the armrest 100.

(2) From the first position to the third position via the second position (−74°→0°→180°):

That is, the armrest 100 rotates from a folded position to the position at which the armrest 100 is to be used by the passenger accommodated in the rear seat. In the present process, it is not necessary to push the button 1, and the passenger may directly rotate the armrest 100 while overcoming the frictional force, i.e., overcoming the frictional force generated by the brake wheels 17 and 18 and the brake wheel pads 19 and 20. The armrest 100 may be stopped at any position, and the third stepped part 66 of the cam 60 restricts a rearward rotation angle (180°→0°).

(3) From the third position to the second position (180°→0°):

That is, the armrest 100 rotates from the position to be used for the passenger accommodated in the rear seat to the position to be used for the passenger accommodated in the front seat. In the present process, the passenger may directly rotate the armrest 100 while overcoming the frictional force and stop the armrest 100 at any position. When the armrest 100 moves to the second position (0°), the locking key springs 8 press the locking key 10 and bring the locking key 10 into close contact with the second stepped part 64 of the cam 60. Therefore, the armrest 100 cannot be directly rotated downward when the button 1 is not pushed. According to the rotatable armrest 100 according to the exemplary embodiment of the present invention, the button 1 is used only to fold the armrest downward (0°→−74°).

The rotation armrest and the console assembly according to the exemplary embodiment of the present invention have been described above with reference to the drawings and the specific embodiments. In the exemplary embodiment of the present invention, the case in which the rotation armrest is applied to the vehicle has been described. However, the exemplary embodiment of the present invention may be applied to trains, ships, airplanes, and the like. Furthermore, the exemplary embodiment of the present invention may be applied to other positions without being limited to the armrest of the transportation means.

To better interpret and accurately define the appended claims, and the terms "upper", "lower", "inner", "outer", "top", "bottom", "upper side", "lower side", "upward", "downward", "front", "rear", "back", "inner side", "outer side", "inward", "outward", "inner portion", "outer portion", "inner", "outer", "forward", and "rearward" are intended to explain the features of the exemplary embodiment with reference to the positions of the features illustrated in the drawings.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A rotatable armrest apparatus comprising:
   a housing;
   a button system; and
   a hinge system engaged to the button system, wherein the button system and the hinge system are provided in the housing, and wherein the hinge system includes a hinge shaft, and the rotatable armrest apparatus is fixed at a first position, a second position, or a third position by being rotated about the hinge shaft, and wherein the rotatable armrest apparatus is configured to be positioned to be folded downward at the first position, the rotatable armrest apparatus is configured to be positioned to be directed forward horizontally at the second position, and the rotatable armrest apparatus is configured to be positioned to be directed rearward horizontally at the third position.

2. The rotatable armrest apparatus of claim 1, wherein the housing includes an upper cover and a lower cover, and an opening portion is provided at a front side of the housing.

3. The rotatable armrest apparatus of claim 2, wherein the button system includes a button and a wire, the button is positioned in the opening portion, and the wire is pulled when the button is pushed.

4. The rotatable armrest apparatus of claim 3, wherein the button system further includes a button rod, a lever, and a button spring, and wherein a first end portion of the button rod is provided at a rear side of the button, a second end portion of the button rod is connected to the button spring, the button spring applies a restoring force to the button rod forward, the button rod has a groove, the lever is provided rotatable about a pin shaft, a first end portion of the lever is provided in the groove of the button rod, and a second end portion of the lever is connected to an end portion of the wire.

5. The rotatable armrest apparatus of claim 4, wherein the button system further includes a button cover and a button plate, wherein the button, the button rod, the lever, and the button spring are provided on the button plate, and wherein the button cover covers the button, the button rod, the lever, and the button spring from above.

6. The rotatable armrest apparatus of claim 1, wherein the hinge shaft includes a cam having three stepped portions, each of the three stepped portions include an arc portion and a stepped part, the stepped part extends in a radial direction, and the arc portion extends from a high-level stepped portion to a low-level stepped portion thereof.

7. The rotatable armrest apparatus of claim 6, wherein the three stepped portions include a first stepped portion, a second stepped portion, and a third stepped portion, and wherein the first stepped portion includes a first arc portion and a first stepped part positioned on a bottom portion of the cam, the second stepped portion includes a second stepped part positioned at an upper side, and a second arc portion extending from a bottom portion of the first stepped part to an upper portion of the second stepped part, a diameter of the second arc portion increases as an arc becomes closer to the second stepped part, the third stepped portion includes a third stepped part positioned at a rear side of the cam, and a third arc portion extending between a bottom portion of the second stepped part and a bottom portion of the third stepped part, and a diameter of the third arc portion is not changed.

8. The rotatable armrest apparatus of claim 1, wherein the hinge system further includes a hinge plate, a support body assembly, a locking key assembly, and a brake wheel assembly, and wherein the support body assembly, the locking key assembly, and the brake wheel assembly are provided on the hinge plate, and the hinge shaft is provided on the brake wheel assembly.

9. The rotatable armrest apparatus of claim 8, wherein the support body assembly includes an upper brake wheel cover and a lower brake wheel cover, and wherein a brake wheel cover opening portion is provided in a lateral surface of the upper brake wheel cover directed forward.

10. The rotatable armrest apparatus of claim 8, wherein the brake wheel assembly includes a brake wheel and a brake wheel pad, wherein the hinge shaft is provided to penetrate the brake wheel and is fixedly connected to the brake wheel, and wherein the brake wheel pad is provided on the support body assembly and comes into friction contact with the brake wheel.

11. The rotatable armrest apparatus of claim 10, wherein the brake wheel and the brake wheel pad are manufactured as friction members.

12. The rotatable armrest apparatus of claim 10, wherein a brake wheel spring is provided at a side of the brake wheel pad and provides an elastic force to the brake wheel pad.

13. The rotatable armrest apparatus of claim 9, wherein the hinge shaft includes a cam having three stepped portions, wherein the locking key assembly includes a locking key, a locking key cover, and a locking key spring, and the locking key cover is provided on the upper brake wheel cover, and wherein the locking key is provided on the locking key cover, a first end portion of the locking key is connected to a wire of the button system, a second end portion of the locking key is engaged with one of the three stepped portions of the cam, and the locking key spring applies a force to the locking key in a direction toward the one stepped portion.

14. The rotatable armrest apparatus of claim 13, wherein the locking key includes a main body and a guide rod, the main body is accommodated in the locking key cover, is provided to penetrate the brake wheel cover opening portion of the upper brake wheel cover, and is engaged with the one stepped portion of the cam, the guide rod protrudes from the locking key cover, and the locking key spring is provided on the guide rod.

15. A console assembly comprising:

a console;

the rotatable armrest apparatus of claim 1, and a connection device configured to install the rotatable armrest apparatus on the console.

16. The console assembly of claim 15, wherein the connection device includes a hinge mounting bolt for installing an armrest assembly on the console.

\* \* \* \* \*